Oct. 24, 1944.     M. J. CRASS     2,361,014
PORTABLE CABLE TAPE WINDING MACHINE
Filed May 10, 1943     2 Sheets-Sheet 2
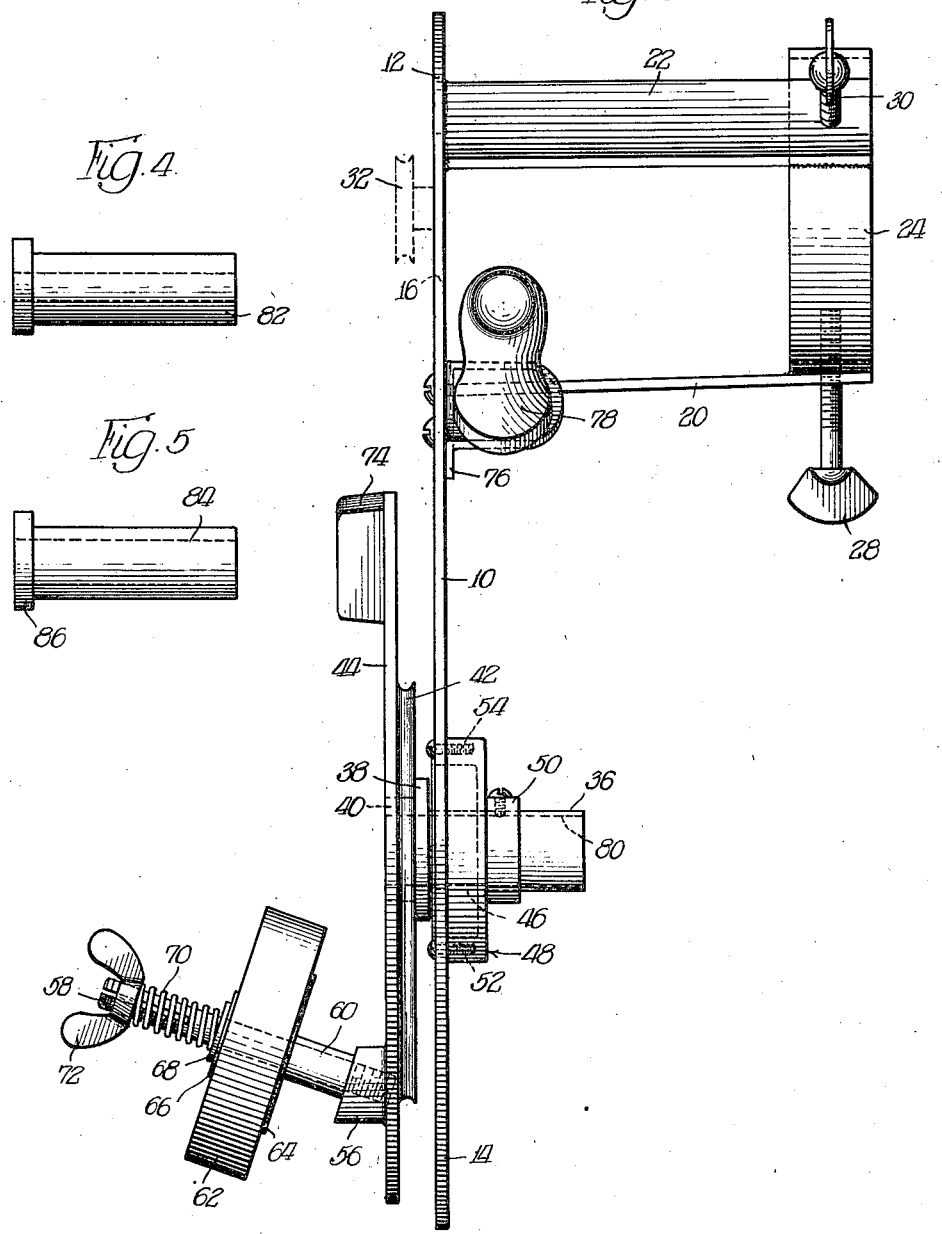
INVENTOR.
Merton J. Crass,
BY Stone, Artman + Bisson
ATTYS.

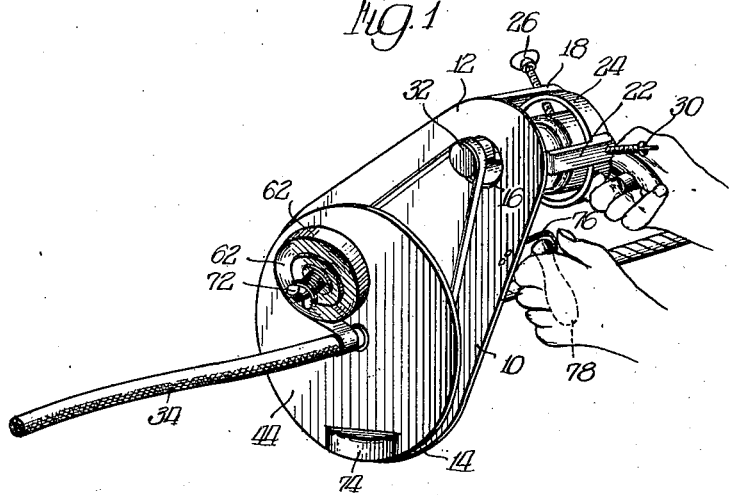
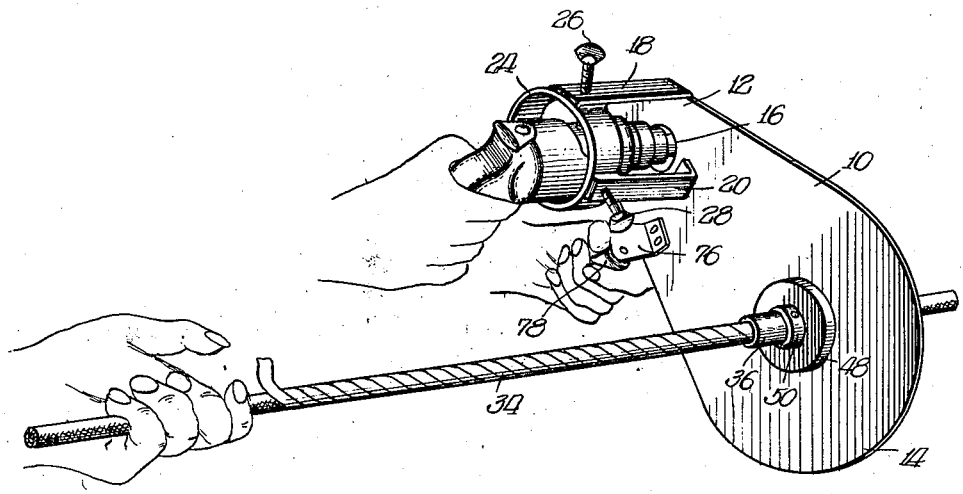

Patented Oct. 24, 1944

2,361,014

UNITED STATES PATENT OFFICE 2,361,014

PORTABLE CABLE TAPE WINDING MACHINE

Merton J. Crass, Sturgeon Bay, Wis.

Application May 10, 1943, Serial No. 486,392

6 Claims. (Cl. 57—10)

This invention relates to a portable cable tape winding machine.

It is frequently desirable to tape a comparatively long cable or a plurality of cables into a single unit at a point of installation where it is not practical to use standard factory cable taping equipment. Thus, in the construction of ships, a great many cable taping operations, some involving the taping of many feet of cable, are performed by hand on the job during construction. Hand taping if done well is quite slow and therefore costly.

Broadly, the object of this invention is to provide a portable, cable taping machine.

In designing such a machine, a further object has been to provide a tool without power of its own but which may nevertheless be quickly assembled with a portable power drill of the type commonly available in construction projects. One of the features of this invention is the provision of means for readily assembling an ordinary gun grip, trigger controlled, hand drill with the cable taping device in such a way that a workman can hold the handle of the drill in one hand and another handle on the cable taping machine in the other and easily watch and control the taping operation. In this arrangement a small drive pulley is mounted in the chuck of the drill and a belt operating from this pulley drives the cable taping mechanism.

Another object of this invention is to provide a means for readily adapting the cable taping machine to different sized cables. In such devices, it is desirable to hold the cable to be taped against lateral movements with respect to the tape winding mechanism as a whole. In applicant's device, means is provided for quickly assembling with the tape winding mechanism one of several cylindrical bushings, each with the same outside diameter but each with an inside diameter such as to pass a cable of a selected size.

Other objects of the invention include the provision of a plate frame member, of a simple means for adjusting the tightness of the tape winding around the cable, and new and improved means for holding the tape spindle in windable engagement with the cable.

These and such other objects as may hereinafter appear are obtained in one embodiment of the invention shown in the accompanying drawings comprising two sheets wherein:

Figure 1 is a perspective view of the device from the cable taping side;

Figure 2 is a perspective view from the other or taped cable delivery side;

Figure 3 is a side elevation of the device; and

Figures 4 and 5 are elevations of bushings used to adapt the device to cables of different sizes.

Continuing to refer to the drawings, the numeral 10 identifies a body plate having a reduced end 12 for supporting a source of power and an enlarged end 14 for supporting the cable winding equipment. The plate may be described as ovate. In the reduced end 12 of the ovate plate 10 is an opening 16 and spaced around the opening 16 and extending from one side of the body plate 10 are three braces 18, 20 and 22 fastened to the body plate 10 by any suitable means and extending outwardly to hold a ring member 24 mounted 120 degrees apart through the braces 18, 20 and 22. Positioned around the ring member 24 are three set screws 26, 28 and 30. By means of these set screws, it is quite easy to position a hand drill within the ring 24 in such a way that its chuck, not shown, will project through the opening 16. Mounted in the chuck is a small drive pulley 32.

As may be seen in Figures 1 and 2, a cable to be taped 34 is passed through a guide means at substantially right angles to the plane of the ovate plate 10. This guide means comprises a sleeve 36 having an annular collar 38 and a reinforced end portion 40. Seated over this reinforced end portion 40 are a pulley 42 and a disc 44, the relationship of the pulley 42 and the disc 44 being made rigid with respect to the sleeve by any suitable means. The sleeve 36 is mounted by any suitable means such as a squeeze fit with the inside surface 46 of a conventional bearing unit 48 and by a collar 50, which having a larger outside diameter than the inside diameter of the bearing unit will hold the sleeve from endwise movement when fastened thereto by any suitable means such as a weld. The bearing unit 48 is mounted in an opening in the ovate plate 10 by any suitable means such as screws 52 and 54.

To one side of the axis of the sleeve 36 on the outside face of the disc 44 is mounted a support 56 in which may be positioned a stud 58. A sleeve 60 is positioned over the stud 58 and then a spool of tape 62 is positioned between two spool supports 64 and 66. A washer 68 engages the surface of the spool support 66 against which it is thrust by means of an expansion spring 70 exerting variable pressure thereagainst depending upon the position of the wing nut 72. A counterweight 74 is positioned 189 degrees away from the spool support, also outside of the disc 44.

Referring to Figure 3 a bracket 76 attached to the ovate plate 10 carries a handle grip 78. By mounting a conventional gun grip, portable drill in the ring 24 and holding it there by means of the set screws 26, 28, and 30 so that the end of the drill may carry a small pulley 32, which will be in alignment with the pulley 42, one has a portable machine which may be gripped by the two hands easily and yet permit the operator to watch the tape winding operation. The movement of the device lengthwise of the cable will, of course, depend entirely upon the operator, this not being automatic. It is therefore important that the relationship of the portable drill to the tape winding device be such that it will not be awkward to hold the hand grip of the drill in an uncomfortable position while operating the mechanism. The mechanism functions or does not function in accordance with the operator's grip on the trigger of the drill. The relationship of these grips is one of the features of this invention.

It will be appreciated that the opening 80 or inside diameter of the sleeve 36 should not greatly exceed the outside diameter of the cable to be taped after the taping operation has been performed because the cable must not be permitted to move laterally when the spool of tape 62 is actually functioning. A neat job would not result if this were permitted. In order to adapt this device to various sizes of cable, a plurality of bushings such as 82 and 84 having various inside diameters are provided. It is not necessary to rigidly fasten these bushings within the sleeve 36, for the taping operation moves from right to left, as viewed in Figures 3 and 1 and the collar such as 86, see Figure 5, on the bushing simply engages the sleeve 36 and remains there until the particular cable taping operation is completed.

Having thus described my invention, what I claim as new and desire to secure by Letters Patent of the United States is:

1. A portable cable tape winding machine comprising a frame, a means on said frame for holding a cable against lateral movement, tape winding means revoluble around said holding means, means on the frame for holding the shaft of a portable hand drill at substantially right angles to the axis of the revoluble tape winding means, a small pulley for mounting on the shaft of the hand drill, a large pulley mounted on the tape winding means for revolving the same, and a belt drivingly engaging both pulleys.

2. A portable cable tape winding machine comprising a frame, an opening through said frame for guiding a cable and holding the latter against lateral movement, a tape winding means revoluble around said opening, a pulley mounted concentric with said opening and drivingly connected to said tape winding means, means on the frame for holding a pulley disposed on the drive shaft of a portable hand drill substantially in the plane of the first mentioned pulley, and a belt drivingly engaging both pulleys.

3. A portable cable tape winding machine comprising a flat frame member, guide means through the flat frame member for holding a cable to be taped so that its axis is at substantially right angles to the plane of the flat frame member, a pulley rotatable around said guide means on one side of the frame member, a spindle for holding a spool of tape mounted on and to one side of the axis of said pulley, means mounted on the flat frame member for holding a second pulley disposed on the drive shaft of a portable hand drill substantially in the plane of the first named pulley, and a belt for drivingly connecting the two pulleys.

4. A portable cable tape winding machine comprising a flat plate, a revoluble sleeve mounted transversely through said flat plate, a pulley mounted on said sleeve on one side of the flat plate, a spindle for holding a spool of tape mounted on and to one side of the axis of said pulley, an opening in said plate spaced from the revoluble sleeve, means disposed on the side of the flat plate opposite to the pulley side for holding the shaft of a portable hand drill through said opening, a second pulley for mounting on the end of the drill shaft substantially in the plane of the first named pulley, and a belt for drivingly connecting the two pulleys.

5. A portable cable tape winding machine comprising an ovate plate, a rotatable sleeve mounted transversely to the plane of said plate in its large end, a pulley mounted on said sleeve, a stud for holding a spool of tape mounted on and to one side of the axis of said sleeve, an opening in the small end of said ovate plate, means adjacent said opening for holding a power driven shaft therethrough, and belt means for connecting the pulley to the power driven shaft.

6. A portable cable tape winding machine comprising a frame having a left side, a right side, a far end, and a near end, means at the far end of said frame for guiding a cable to be taped transversely of the frame, means on the left side of the frame for winding tape around said cable when it is in the guiding means, said winding means being revoluble in a plane substantially parallel to the length of the frame, a handle extending away from the near end of the frame, means on the right side of the frame at the near end thereof for holding a power hand drill with its shaft projecting through the frame to the left side thereof so that the power drill handle will be to the right of the frame, and a driving connection between the drill shaft and the winding means, whereby an operator may hold the outwardly extending handle in his left hand and the power drill handle in his right hand while the progress of tape winding may be readily observed.

MERTON J. CRASS.